United States Patent [19]
Barringer

[11] 3,836,254
[45] Sept. 17, 1974

[54] OPTICAL CORRELATOR WITH OPTIMIZED MAXIMUM AND MINIMUM CORRELATION MASKS

[75] Inventor: Anthony Rene Barringer, Willowdale, Ontario, Canada

[73] Assignee: Barringer Research Limited, Ontario, Canada

[22] Filed: Dec. 15, 1969

[21] Appl. No.: 885,387

[52] U.S. Cl. ............... 356/74, 250/237 G, 356/93, 356/97, 356/106 S
[51] Int. Cl. ........ G01j 3/00, G01j 3/42, G01b 9/02
[58] Field of Search ........ 356/74, 97, 106, 112, 51, 356/79, 82, 93, 96, 106 S; 250/43.5, 83.3, 237 G

[56] References Cited
UNITED STATES PATENTS
3,518,002  6/1970  Barringer et al. .................... 356/97

Primary Examiner—Vincent P. McGraw
Attorney, Agent, or Firm—Rogers, Bereskin & Parr

[57] ABSTRACT

An optical correlator having an optical wedge or other device for producing a spatially dispersed pattern of light in a plane, the light being characterized by zones of relatively high intensity and low intensity corresponding to spectra present in the incident light or the Fourier transform thereof. The dispersed light is alternately or simultaneously passed through a first mask having a pattern of opaque and transparent regions or lines positioned to correlate with the zones of relatively high intensity light and a second mask having a plurality of opaque and transparent regions or lines positioned to correlate with the relatively low intensity zones of light. A photodetector examines the light passing through the masks and produces and output signal which can be analyzed to determine the character of the incident radiation.

6 Claims, 8 Drawing Figures

INVENTOR.
ANTHONY RENE BARRINGER

INVENTOR.
ANTHONY RENE BARRINGER
BY
Rogers, Bereskin, & Parr

OPTICAL CORRELATOR WITH OPTIMIZED MAXIMUM AND MINIMUM CORRELATION MASKS

This invention relates to the art of optical analysis of spectra and in particular to a correlation interferometer having optimized maximum and minimum correlation masks, for use in analyzing spectra.

This invention is related to inventions disclosed in copending U.S. application Ser. No. 696,165 filed Jan. 8, 1968 for Spatially Dispersive Correlation Interferometer by Anthony Rene Barringer. The interferometer disclosed therein utilizes an optical wedge or other interferometric devices to produce interference fringes when light is incident upon it. A mask containing a predetermined pattern of lines is positioned in the plane wherein the fringes are formed, and means is provided for vibrating the mask between a first position (herein called the correlation position) wherein the lines of the mask correlate with the fringes and a second position (herein called the anti-correlation position) where the lines of the mask do not correlate with the fringes. Light containing spectra of a particular substance is transformed by the optical wedge into a unique pattern of fringes. When the fringes correlate with the lines on the mask, the light passing through the mask cyclically varies in intensity as the mask is vibrated to and fro. The light passing through the mask is directed towards a photodetector, and the output of the photodetector, after appropriate amplification, is synchronously detected at the vibration frequency of the mask to obtain an output signal proportional in amplitude to the intensity of the spectra present in the incident light.

In the interferometer described above, the mask was produced by exposing a piece of photographic film to the dispersed light, or by ruling opaque lines on a piece of transparent film at predetermined positions. Except for monochromatic light, the separation of the fringes and hence the separation of the lines of the mask is quite irregular. The optimum amplitude of displacement of the fringes relative to the lines on the mask between the correlation and anti-correlation positions was usually obtained experimentally by varying the amplitude of displacement until the strongest alternating current signal was obtained at the output of the photodetector. In the case of irregularly spaced fringes, the "optimum" displacement obtained in this manner was at best a compromise, because in the anti-correlation position there was still some correlation between the lines on the mask and the fringes, due to the irregular nature of the fringes.

An object of the present invention is to provide an optical correlator for analysing incident radiation, wherein the differential amount of light passing through the correlator in the correlation and anti-correlation positions is maximized, so that the sensitivity of the correlator is thereby optimized.

A preferred form of the invention includes an optical wedge or other interferometric device for producing a spatially dispersed pattern of light in a plane, The light being characterized by zones of relatively high intensity and low intensity corresponding to the Fourier transform of the absorption spectrum of a particular substance when the characteristic spectra of the substance are present in the incident radiation, a first mask having a pattern of opaque and transparent regions or lines positioned to correlate with the zones of relatively high intensity light, a second mask having a plurality of opaque and transparent regions or lines positioned to correlate with the relatively low intensity zones of light, means for cyclically passing the light emerging from the optical wedge alternately through the first mask and the second mask, a photodetector positioned for receiving the light which has passed through both masks, and electronic circuit means coupled to the photodetector for analysing the output of the photodetector. When the light emerging from the optical wedge is directed through the first mask, and the characteristic spectra corresponding to the lines on the first mask are present in the incident light, there is perfect correlation between the fringes produced by the wedge and the transparent lines on the first mask, and there is maximum transmission of the light. When the light beam is directed through the second mask, there is correlation between the transparent lines on the second mask and the dark fringes or low intensity zones, and there is minimum transmission of the light. The resulting alternating current signal produced by the photodetector is therefore of maximum amplitude.

As used herein, the terms "light" or "radiation" refer to electromagnetic radiation of wavelengths between short x-ray and long infrared.

Figure 1:
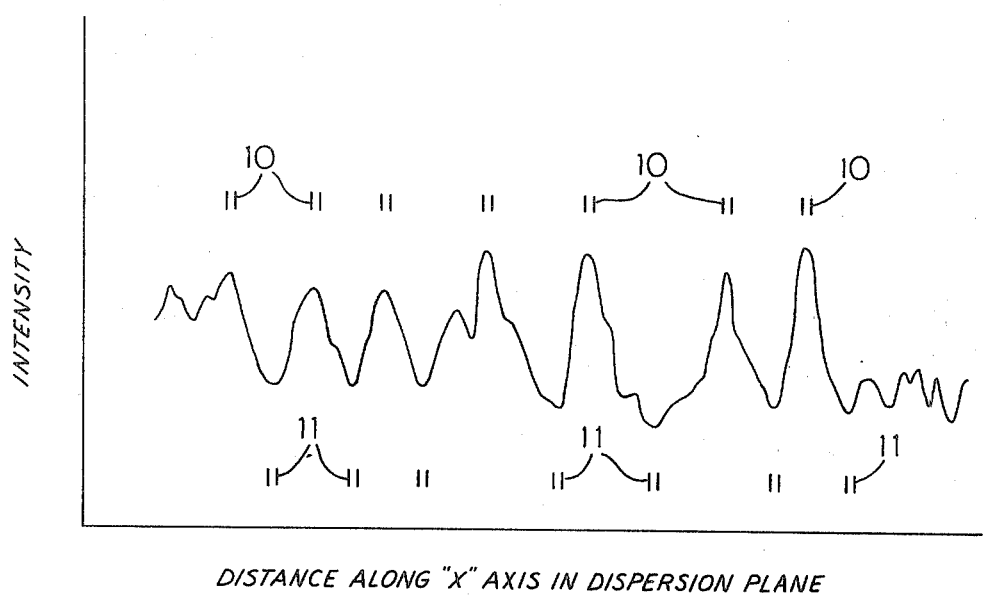
FIG. 1 is a graph showing a typical spectrum of dispersed radiation such as fringes formed by an interferometer.
Figure 8:
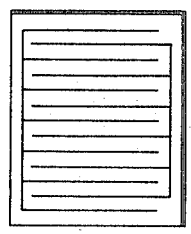
Figure 7:
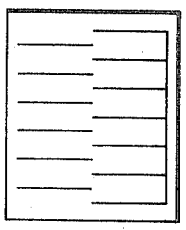

FIGS. 7 and 8 are views showing mask patterns applied to a photodetector substrate Referring to FIG. 1, the graph illustrated therein shows a typical plot of intensity of dispersed light (such as fringes produced by an interferometer) as a function of distance. For example, in the case of an interferometer, the peaks in the graph would represent bright fringes, the intensity of the fringes being a function of position in the plane in which the fringes are formed. Reference numerals 10 denote the positions of the points of maximum intensity of the dispersed radiation. Reference numerals 11 denote positions of minimum light intensity in the dispersed radiation. In the present invention, as indicated above, two masks are used, and the dispersed radiation is alternately transmitted through the two masks. The transparent lines of one mask are positioned at the points 10 of maximum light intensity, and the lines of the other mask are positioned at the points 11 of minimum light intensity. The differential intensity of the light passing through the first and second masks is therefore a maximum. This concept is utilized in the various forms of optical analysers described herein.

Figure 2:
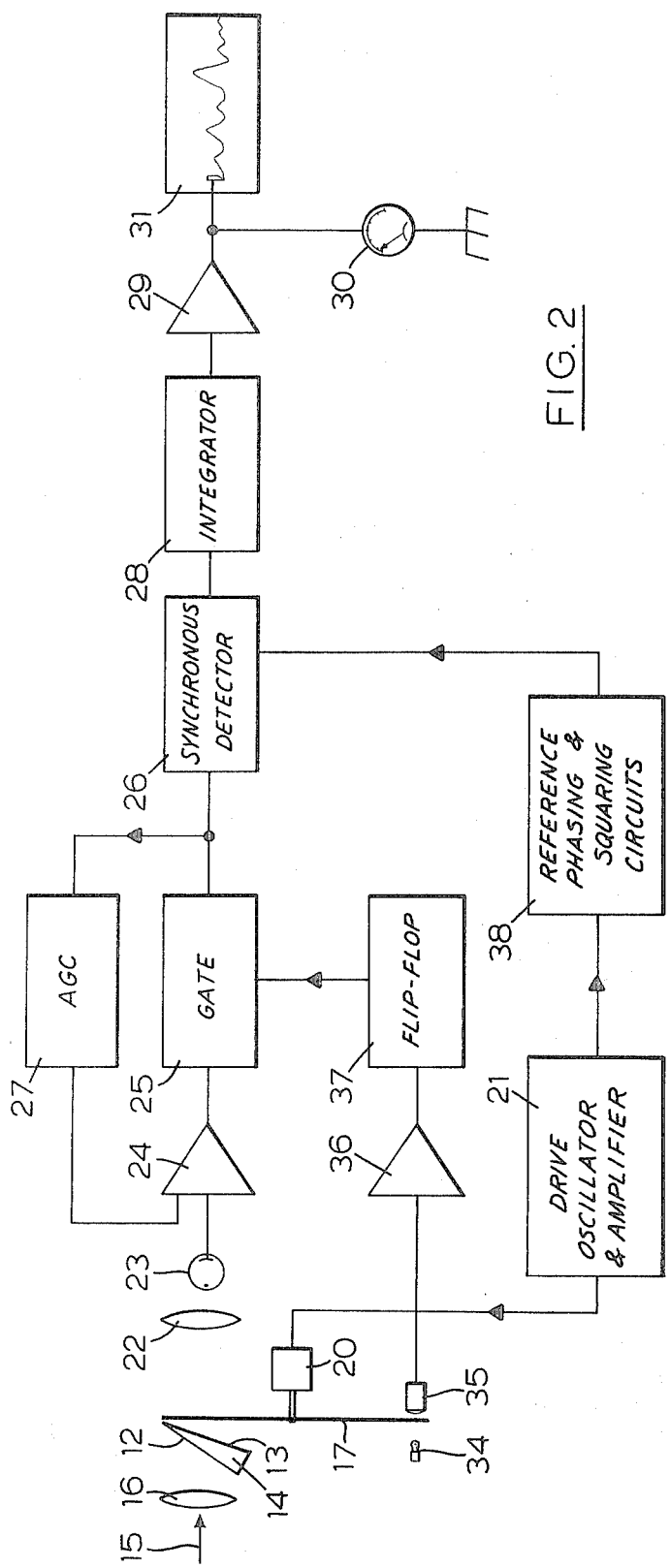
FIG. 2 is a block diagram showing a preferred form of the invention.

Referring to FIG. 2, a wedge shaped thin transparent plate with semi-reflecting surfaces 12 and 13 forms a wedged etalon or Fabry-Perot interferometer 14 (hereinafter called the wedge) having a small interfacial angle α. A light beam represented by arrow 15 is collimated by a lens 16 and suffers interference as it passes through the wedge 14. The wedge 14 transforms the incident light into a pattern of fringes which characterize the spectral content of the incident light. A rotatable disc 17 is positioned in the plane wherein the fringes are formed, and the disc 17 contains a correlation mask 18 and an anti-correlation mask 19, both of which will be described in greater detail below. The disc 17 is rotated continuously by motor 20 that is driven at a constant predetermined speed by a conventional drive oscillator and amplifier 21.

Light which has been transmitted through either the mask 18 or the mask 19 is directed by a lens 22 to the sensitive face of a photodetector 23. The output of the photodetector 23 consists of a d.c. component proportional to the intensity of the incident light and an a.c. component when the lines of the mask 18 correlate with the fringes produced by the wedge 14. The output of the photodetector 23 is fed to a preamplifier 24, the output of which is connected to a gate 25. The output of the gate 25 is fed to the input of a synchronous detector 26, and a portion of the output of the gate 25 is sampled by a conventional AGC circuit 27 which is connected to the preamplifier 24 and which is adapted to vary the gain thereof in accordance with variations in the level of the d.c. component at the input of the synchronous detector 26 from the level of a predetermined fixed reference d.c. level developed in the AGC circuit 27. This or other conventional AGC circuits may be used to compensate for changes in intensity of the source of incident light.

The output of the synchronous detector 26 consists of a d.c. voltage proportional to the intensity of the light shining through the masks 18 and 19 and to the level of the a.c. modulation component occurring when the lines in the mask 18 correlate with the fringes produced by the wedge 14, as described above. The output of the synchronous detector 26 is fed to a conventional integrator 28 which integrates to zero any random noise components present in the output of the synchronous detector 26. The output of the integrator 28 is amplified by conventional output amplifier 29 and the level of the output of the amplifier 29 is indicated by a meter 30 or other suitable recording or displaying means 31 such as a pen recorder. The level of the voltage indicated by the meter 30 or the display means 31, when compensated for changes in ambient intensity of the incident light, is indicative of the intensity of the spectra in the incident light which give rise to fringes correlating with the lines of the mask 18.

The mask 18 consists of a piece of photographic film having a series of opaque lines, as described above. The mask 18 may be formed by exposing a piece of photographic film to the fringes produced by the wedge 14 when light containing a particular absorption or emmission spectrum of interest is caused to shine through the wedge 14 and to thereby expose the film. For example, in order to make a mask for $NO_2$ gas, incident light obtained from a broad band source is shone through a cell containing $NO_2$ gas, so that light emerging from the cell is of reduced intensity at wave lengths defined by the absorption spectrum of the $NO_2$ gas. The fringes so produced are uniquely characteristic of $NO_2$ gas, and therefore the lines in the mask 18 (which constitute an image of the fringes) is also characteristic of $NO_2$ gas.

Alternatively, the mask 18 can be made by calculating the positions at which the zones of maximum intensity of the dispersed radiation occur, and ruling india ink lines on a piece of transparent film at appropriate positions. The mask 19 is produced by ruling india ink lines on a transparent piece of film at positions between the points of minimum intensity in the dispersed spectrum of interest. The disc 17 is oriented at right angles to the beam of light passing through it, and the masks 18 and 19 are positioned so that they are alternately aligned with the fringes as the disc 17 rotates. Accordingly, during each cycle the mask 18 and the mask 19 are brought into registery with the stationary fringe pattern produced by the wedge 14.

When the light incident upon the wedge 14 contains spectra which give rise to fringes correlating with the lines on the masks 18 and 19, the light shining on the photodetector 23 will vary in amplitude from a maximum when the mask 18 correlates with the fringes and a minimum when the mask 19 correlates with the fringes. Accordingly, the output of the photodetector 23 is then modulated by an alternating current voltage, the level of which is proportional to the intensity of the spectra present in the incident light.

In order to ensure that the masks 18 and 19 are in proper registration with the stationary fringe pattern produced by the wedge 14, two fine slits 32 and 33 are formed on diametrically opposite sides of the disc 17, and a small light source 34 and a photodetector 35 are positioned near the periphery of the disc 17 and on opposite sides thereof. As the disc 17 rotates, the slits 32 and 33 are periodically aligned with the light source 34 and the photodetector 35, so that a pulse appears at the output of the photodetector 35 twice during each complete rotation of the disc 17. The timing of these pulses coincides exactly with the times when the masks 18 and 19 are respectively in alignment with the fringes produced by the wedge 14. The output of the photodetector 35 is fed to an amplifier 36, the output of which is connected to a flip flop 37. The output of the flip flop 37 is connected to the gate 25, and the gate 25 is thereby caused to open for a short predetermined interval immediately following each occurance of a pulse at the output of the photodetector 35. Accordingly, the light passing through the wedge 14 is sampled twice during each revolution of the disc 17, once when the mask 18 is aligned with the fringes and once when the mask 19 is aligned with the fringes. During the remainder of the period of rotation of the disc 17, the gate 25 is closed and no output signal is fed to the synchronous detector 26.

The frequency of rotation of the disc 17 is preferably as high as possible, for example of the order of 30 c.p.s. In order to provide a reference signal for synchronizing the synchronous detector 26, an output signal is derived from the drive oscillator and amplifier 21 which drives the motor 20, and this output signal is fed to conventional reference phasing and squaring circuits 38 which produce a square wave output signal of the same frequency as the voltage which energizes the motor 20.

It has been found convenient for mechanical reasons to arrange the wedge 14 so that the incident light makes an angle of about 45° with it, although this is not at all critical. If the incident light is normal or close to normal to the wedge 14, the fringes are either in the wedge 14 or close to it, and lenses might be required for imaging the fringes at a more convenient place.

It is important to ensure that the total light transmission through each of the masks 18 and 19 for white light is equal, i.e., the integrated area of the transparent portions of the masks should be equal. This can be done by adjusting the width of the transparent areas by appropriate amounts to provide equal transmission. If this condition is satisfied, the light transmitted through the masks 18 and 19 will be of equal intensity for white light (i.e., a continuum) incident upon the wedge 14. If characteristic spectra are present in the incident light, the fringes of which correlate with the lines of the masks, there will be a change in light level as the masks 18 and 19 are alternately brought into registration with the fringes.

The width of the lines of the mask are generally selected to be narrow, the precise width depending upon the resolution of the interferometer and the expected intensity of the incident light. When the incident light is of very low intensity, it may be necessary to use relatively wide transparent lines or slits.

Figure 4:
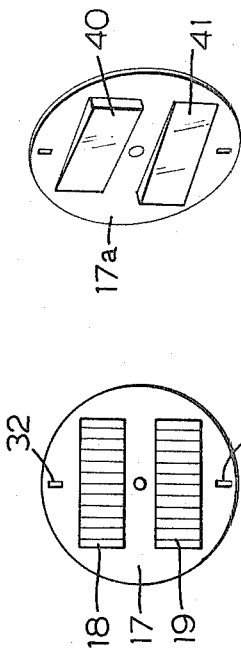
FIG. 4 is a somewhat diagrammatic view of a rotatable disc for use with a modified form of the apparatus shown in FIG. 2.
Figure 3:
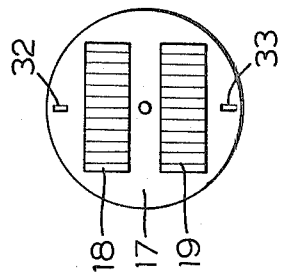
FIG. 3 is a somewhat diagrammatic view showing a rotatable disc containing maximum and minimum masks for use with the embodiment of FIG. 2.

FIG. 4 shows an alternative form of the disc 17, for use with the apparatus of FIG. 2. Instead of employing a fixed wedge 14 as in the case of the apparatus of FIG. 2, in this case two identical wedges 40 and 41 are fixed to the disc 17. The masks 18, 19 are respectively affixed directly to the back of the wedges 40, 41. The disc 17a can be used interchangably with the disc 17 in the system shown in FIG. 2, except that the wedge 14 is removed from the system.

Although reference has been made to the use of masks contained in a rotating disc, it will be understood that other arrangements can be employed for alternately shining the light emerging from the wedge through the correlation and anti-correlation masks. For example, the masks 18 and 19 could be moved linearly by any appropriate mechanism to achieve the desired result. Similarly, the light beam emerging from the wedge 14 could be directed by conventional means alternately through the respective masks.

The disc 17 was described above with reference to only one correlation mask 18 and one anti-correlation mask 19. If desired, a number of pairs of correlation/anti-correlation masks can be provided around the periphery of the disc 17, so that the interferometer is then capable of measuring as many different substances as there are pairs of correlation/anti-correlation masks on the disc 17. The output of the photodetector 23 will then consist of a series of pulses which can appropriately be fed into different synchronous detection channels in order to provide simultaneous readout of several different substances.

Figure 5:
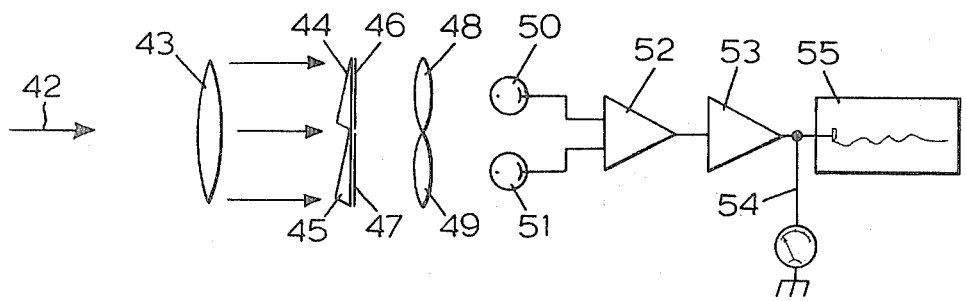
FIG. 5 is a block diagram showing a still further embodiment of the invention.

The embodiment of FIG. 5 differs from the embodiment of FIG. 2 in that no moving parts are used. In FIG. 5, incident light represented by an arrow 42 is collimated by a lens 43 and directed towards a pair of similar wedges 44, 45 which are placed side by side in a suitable holder. A correlation mask 46 is affixed to the back of the wedge 44, and an anti-correlation mask 47 is affixed to the back of the wedge 45. The mask 46 and 47 correspond exactly to the masks 18 and 19, respectively, and can be made in exactly the same manner. The light emerging from the wedges 44 and 45 is respectively collected by lenses 48, 49 and fed to separate photodetectors 50, 51. Accordingly, the light emerging from the wedge 44 which passes through the mask 46 is directed to the photodetector 50, and similarly the light emerging from the wedge 45 which passes through the anti-correlation mask 47 is directed to the photodetector 51. When characteristic spectra are present in the incident light 42 which give rise to fringes corresponding to the lines on the mask 46, 47, the level of the outputs of the photodetectors 50 and 51 will not be equal, and the amount of any voltage differential is proportional to the intensity of the spectra present in the incident light. The outputs of the photodetectors 50, 51 are respectively fed to the inputs of a differential amplifier 52, the output of which is fed to a conventional output amplifier 53. The output of the amplifier 53 can be displayed on a meter 54 or other conventional display device 55 such as a pen recorder.

In order to minimize differential drift between the two photodetectors 50, 51, a single photo-detector mosaic can be made in which the correlation and anticorrelation masks are formed directly on a single substrate of photodetector material. Certain known types of photodetector material can be sensitized in desired areas by doping, and thus predetermined patterns of sensitized areas can be formed on photodetector substrates to provide maximum and minimum correlation masks. Thus, on a single substrate, a maximum correlation pattern can be placed alongside a minimum correlation pattern and a single wedge placed in front (FIG. 7). A portion of the light coming through the wedge will fall on the maximum correlation pattern, another portion on the minimum correlation pattern. The differential output between the two halves of the detector is subsequently derived electronically and the resulting signal is processed in the manner described above. An advantage of this arrangement is that differential drift problems are minimized. Alternatively, instead of leaving insensitive areas between the sensitive areas of the photodetector substrate, the sensitive areas of the minimum correlation pattern can be formed between the sensitive areas of the maximum correlation pattern (FIG. 8). This arrangement, called "interdigitating", effectively utilizes all of the light emerging from the wedge. The electronic signals obtained from each sensitive pattern can be subtracted electronically and processed in the manner described above. It will be understood that known techniques other than doping can be employed in certain cases. For example, at relatively long wavelengths thin film depositions of lead sulphide can be used to form the masks. The masks could be deposited side by side or interdigitated, as described above.

The correlation and anti-correlation masks can be made, as indicated above, by ruling opaque lines on a transparent base, and alternatively the background of the mask can be opaque with transparent lines. Also, the mask could consist of a thin metal plate with slots constituting the transparent lines.

Figure 6:
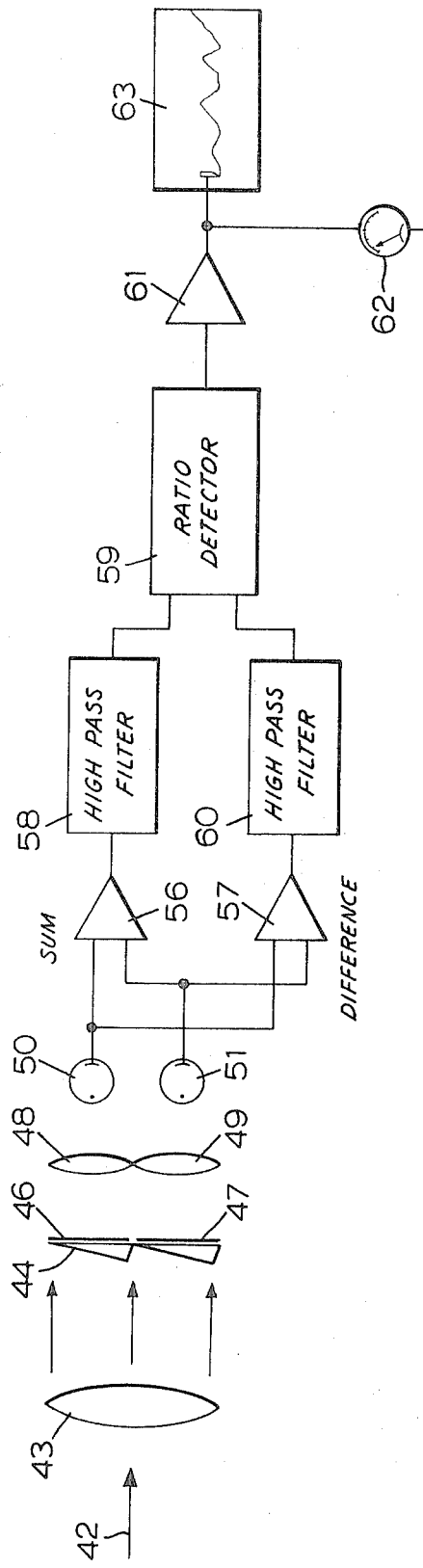
FIG. 6 is a block diagram showing yet another embodiment of the invention.

The embodiment shown in FIG. 6 employs an optical arrangement similar to that of the instrument shown in FIG. 5, but the electronic processing is different. Like reference numerals have been used to denote similar parts of the two embodiments. In this case, the outputs of the photodetectors 50 and 51 are respectively fed to a summing amplifier 56 and to a differential amplifier 57. The output of the summing amplifier 56 is fed to a high pass filter 58, the output of which is connected to one input of a ratio detector 59. The output of the differential amplifier 57 is fed to a high pass filter 60, the output of which is connected to the other input of the ratio detector 59. The output of the ratio detector 59 is fed to an output amplifier 61, the output of which can be measured by means of the meter 62, or other conventional display means 63 such as a pen recorder.

The interferometer described above may be used to monitor the concentration of specific gases in the atmosphere from orbital altitudes. The instrument should be made with high resolution fore-optics so that the instrument has a resolution of about one hundred feet from the altitude at which it is flown. The sum of the outputs of the photodetectors 50, 51 is proportional to the total light throughput of the system; the differential output of the photodetectors 50, 51 is proportional to the concentration of the gas present in the earth atmosphere, times the path length from the instrument to the earth, along the optic axis of the instrument. When the instrument is pointed downwards to examine the terrain beneath a spacecraft, rapid flucuations in light level can be attributed to light which has reached the surface of the ground and has been reflected therefrom. Slow flucuations in light level can be attributed to low spatial frequency variations in albedo of the ground, and variations in scattering from the atmosphere. By passing the summed outputs of the photodetector 50, 51 through the high pass filter 58 (which has a cut-off frequency of about 100 hertz), the output of the high pass filter is then proportional to the high spatial frequency variations in albedo of the ground, and thus the instrument will be responsive only to components of the incident light which have been reflected from the ground. Thus, components of the incident light which have been reflected from haze or scattering will be filtered out, except components attributable to reflections from clouds, which can be identified separately.

If the gas to be measured is present along the optic path of the instrument, there will be flucuations in the differential output of the photodetectors 50, 51 which also correlate with fluctuations in the light level. When considering this differential signal, it will be understood that there is an a.c. component arising from fluctuations of light level due to light coming all the way from the ground and a relatively low frequency component of differential signal which is due to low spatial frequency components of changes in albedo and slow changes in scattering from the atmosphere. By filtering the differential signal with the high pass filter 60 (which is identical to the high pass filter 58), then the waveform obtained at the output of the high pass filter 60 will correlate with that appearing at the output of the high pass filter 58.

Calculations of total vertical burden of gas are carried out by ratioing the amplitude of the differential a.c. component against the amplitude of the a.c. sum component. The signal-to-noise ratio of this ratio can be measured by the degree of coherence between the two a.c. outputs. If there is a cross-correlation factor of one to one between the two a.c. outputs, then the signal-to-noise ratio is obviously extremely high. However, if there is only a very low cross-correlation factor between the two outputs, the signal-to-noise ratio is relatively poor. The electronic circuitry of the system can be designed to place a merit index on this cross-correlation function. A system of the kind described above eliminates many of the uncertainties caused by light scattering.

The invention has been described with particular reference to a wedge for producing fringes, because the wedge is comparatively simple to make, and produces fringes which are parallel and nearly straight. The fringes produced by the wedge are thus particularly suitable for correlation. However, it is contemplated that other interferometric, spatially dispersive devices might be used as well, such as the Fabry-Perot interferometer, Newton's rings apparatus, the Lummer-Gehrcke interferometer, etc. Similarly, while the invention has been described with particular reference to an interferometric device, it will be understood that principles of the invention are equally applicable to spectrometers as well, such as the correlation spectrometer described in co-pending U.S. application Ser. No. 654,202 filed July 18, 1967, now U.S. Pat. No. 3,518,002, by Anthony Rene Barringer. In the case of the spectrometer, any appropriate means can be employed to sweep the beam of light in the spectrometer (e.g., by vibrating the grating) so that the dispersed light is alternately transmitted through the correlation and anti-correlation masks.

What I claim as my invention is:

1. Apparatus for analyzing incident radiation comprising:

a. first and second means for spatially dispersing said incident radiation to form a dispersion of radiation in a plane, said dispersion being composed of radiation zones of relatively low intensity characteristic of a particular substance when the characteristic spectra of said substance are present in the incident radiation, b. first mask means positioned in said plane and in the path of light emerging from said first dispersing means, said first mask means having a plurality of relatively opaque and transparent regions, said regions being correlative with said relatively high intensity zones of said dispersion, c. second mask means positioned in said plane and in the path of light emerging from said second dispersing means, said second mask means having a plurality of relatively opaque and transparent regions, said regions being correlative with said relatively low intensity zones of said dispersion, d. photodetector means positioned to receive light emerging from said first and second mask means, said photodetector means comprising a pair of photosensitive elements mounted on a common substrate, and, e. means coupled to said photodetector means for deriving an output signal proportional to the difference in amplitude between said two signals.

2. Apparatus as claimed in claim 1 wherein the relative widths of the opaque and transparent regions of the first and second mask means is such that the transmissivity of the first and second masks to white light is substantially the same.

3. Apparatus as claimed in claim 1 wherein said photodetector means comprises a pair of photosensitive elements mounted on a common substrate, and wherein the relative widths of the opaque and transparent regions of the first and second mask means is such that the transmissivity of the first and second masks to white light is substantially the same.

4. Apparatus for analyzing incident radiation comprising:
   a. means for spatially dispersing said incident radiation to form a dispersion of radiation in a plane, said dispersion being composed of radiation zones of relatively high intensity and low intensity characteristic of a particular substance when the characteristic spectra of said substance are present in the incident radiation,
   b. a photodetector having a substrate positioned in said plane wherein said dispersion is formed,
   c. said substrate having a first pattern defined by light sensitive and light insensitive regions, said regions being correlative with said relatively high intensity zones of said dispersion, said first pattern producing a first signal,
   d. said substrate having a second pattern defined by light sensitive and light insensitive regions, said regions being correlative with said relatively low intensity zones of said dispersion, said second pattern producing a second signal, and
   e. means coupled to said photodetector for deriving an output signal proportional to the difference in amplitude between said first and second signals.

5. Apparatus as claimed in claim 4 wherein said first and second patterns are interdigitated.

6. Apparatus as claimed in claim 5 wherein the relative widths of the sensitive regions of said first and second patterns is such that said first and second signals are of substantially equal amplitude when said dispersing means is exposed to white light.

* * * * *